(12) United States Patent
Watson (10) Patent No.: US 9,187,025 B2
(45) Date of Patent: Nov. 17, 2015

(54) MOTORCYCLE TRANSPORT INFLATABLE PROTECTOR

(71) Applicant: William M. Watson, Charleston, SC (US)

(72) Inventor: William M. Watson, Charleston, SC (US)

(*) Notice: Subject to any disclaimer, the term of this patent is extended or adjusted under 35 U.S.C. 154(b) by 0 days.

(21) Appl. No.: 14/213,154

(22) Filed: Mar. 14, 2014

(65) Prior Publication Data

US 2014/0271017 A1 Sep. 18, 2014

Related U.S. Application Data

(60) Provisional application No. 61/787,181, filed on Mar. 15, 2013.

(51) Int. Cl.
*B60P 7/08* (2006.01)
*B60P 7/06* (2006.01)
*B60P 7/135* (2006.01)
*B60P 3/079* (2006.01)
*B60P 3/073* (2006.01)

(52) U.S. Cl.
CPC ............... *B60P 7/065* (2013.01); *B60P 3/073* (2013.01); *B60P 3/079* (2013.01); *B60P 7/0823* (2013.01); *B60P 7/0892* (2013.01); *B60P 7/135* (2013.01)

(58) Field of Classification Search
CPC .......... B60P 3/079; B60P 3/073; B60P 7/065; B60P 7/135; B60P 7/0823; B60P 7/0892; B60P 7/16
USPC ........... 410/87, 118, 119, 121, 125, 128, 155; 206/522, 593; 383/25
See application file for complete search history.

(56) References Cited

U.S. PATENT DOCUMENTS 5,833,413 A * 11/1998 Cornelius .................... 410/119

* cited by examiner

*Primary Examiner* — Stephen Gordon (57) ABSTRACT

Inflatable bumper system that stabilizes and protects one or more motorcycles during transport by applying force on both sides of each motorcycle and the walls of the truck or trailer, securing each motorcycle in an upright position, and absorbing any forces resulting from poor road conditions or abrupt driving actions.

8 Claims, 10 Drawing Sheets

Fig. 8

MOTORCYCLE TRANSPORT INFLATABLE PROTECTOR

TECHNICAL FIELD

The present invention relates to protecting motorcycles from damage during transport in trucks or trailers.

BACKGROUND OF THE INVENTION

Motorcycle(s) are often transported in trucks or trailers and are frequently damaged when road conditions or abrupt driving actions cause the motorcycles to move and come into contact with each other or the structure or other contents of the trucks or trailers.

The existing practice to attempt to prevent such damage during transport is to secure each motorcycle to the truck or trailer in an upright position by strapping the front handlebars to anchor points on the floor of the truck or trailer. When the straps are tightened, the front suspension of the motorcycle compresses and the applied force holds the motorcycle in an upright position. The front wheel is also typically held in place on the floor by a wheel chock or clamp. Because there is no compression point in the rear of a typical motorcycle, the rear is either left untethered or tied to the truck bed or trailer to keep it in line with the front tire and restrict lateral movement.

This existing practice often fails to prevent damage to motorcycles due to faulty installation or road conditions or driving actions resulting in forces that compromise the straps, attachments, and clamps, or movement of other contents in the trucks or trailers.

BRIEF SUMMARY OF THE INVENTION

The present invention is an inflatable and nonabrasive bumper having the shape, dimensions, strength, and flexibility when secured to motorcycle(s) and inflated to create forces necessary to stabilize the motorcycle(s) during transport and prevent the motorcycle(s) from moving and coming into contact with other motorcycle(s) or the structure or other contents of the truck bed or trailer.

This invention can be used on its own or as a secondary or backup protective measure in conjunction with the existing practice described above of strapping the motorcycle(s) to anchor points on the truck or trailer.

This invention protects motorcycles from damage during transport to a further degree and extent than any product or method known in the prior art.

DETAILED DESCRIPTION OF THE INVENTION

There are many possible embodiments of the invention, some of which are described below.

Referring now to the embodiments of the invention in FIGS. 1-8, in more detail, there is shown inflated bumper(s) 10, harness loop(s) 10a, harness strap(s) 10b, air valve(s) 10c, motorcycle(s) 11, front suspension(s) 11a, front strap(s) 12, rear strap(s) 13, anchor points(s) 14, truck/trailer floor 15, truck/trailer vertical wall(s) 16.

In further detail, referring to FIG. 1A-E, three inflated bumpers 10 are positioned and apply force on either side and in between two motorcycles 11 and the opposing truck/trailer vertical walls 16 to stabilize the two motorcycles in an upright position. The inflated bumpers 10 are nonabrasive and flexible to the contours of the motorcycles 11 and secured to the motorcycles by harness straps 10b and harness loops 10a. The typical manner known in the art in which motorcycles have been secured for transport prior to this invention is shown by the front strap 12 compressing the motorcycle front suspension 11a through tension to the anchor points 14.

Figure 1A:
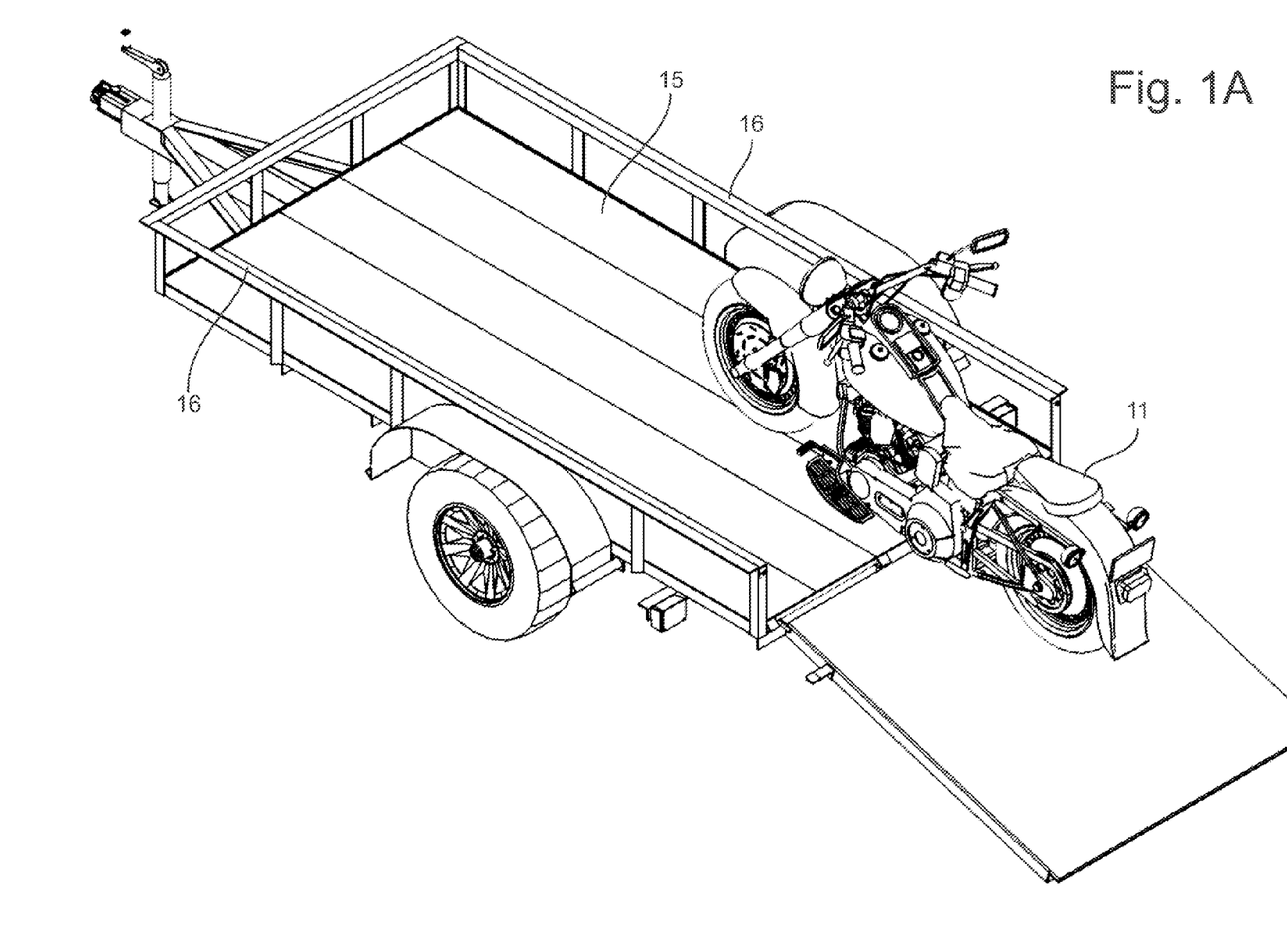
FIGS. 1A-E show the method of loading, positioning, securing, and protecting two motorcycles in a trailer with inflatable bumpers according to one possible embodiment of the invention.
Figure 1B:
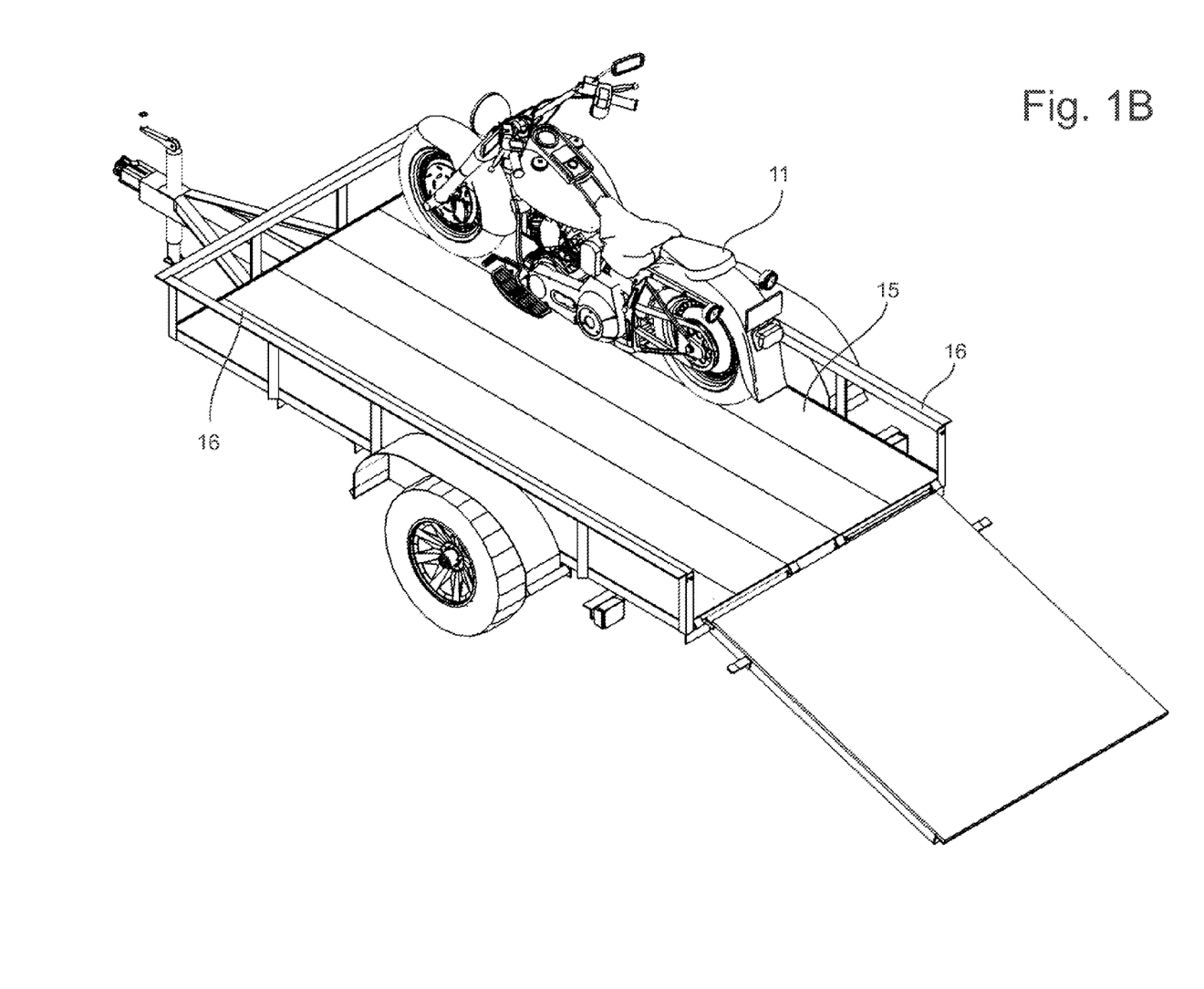
Figure 1C:
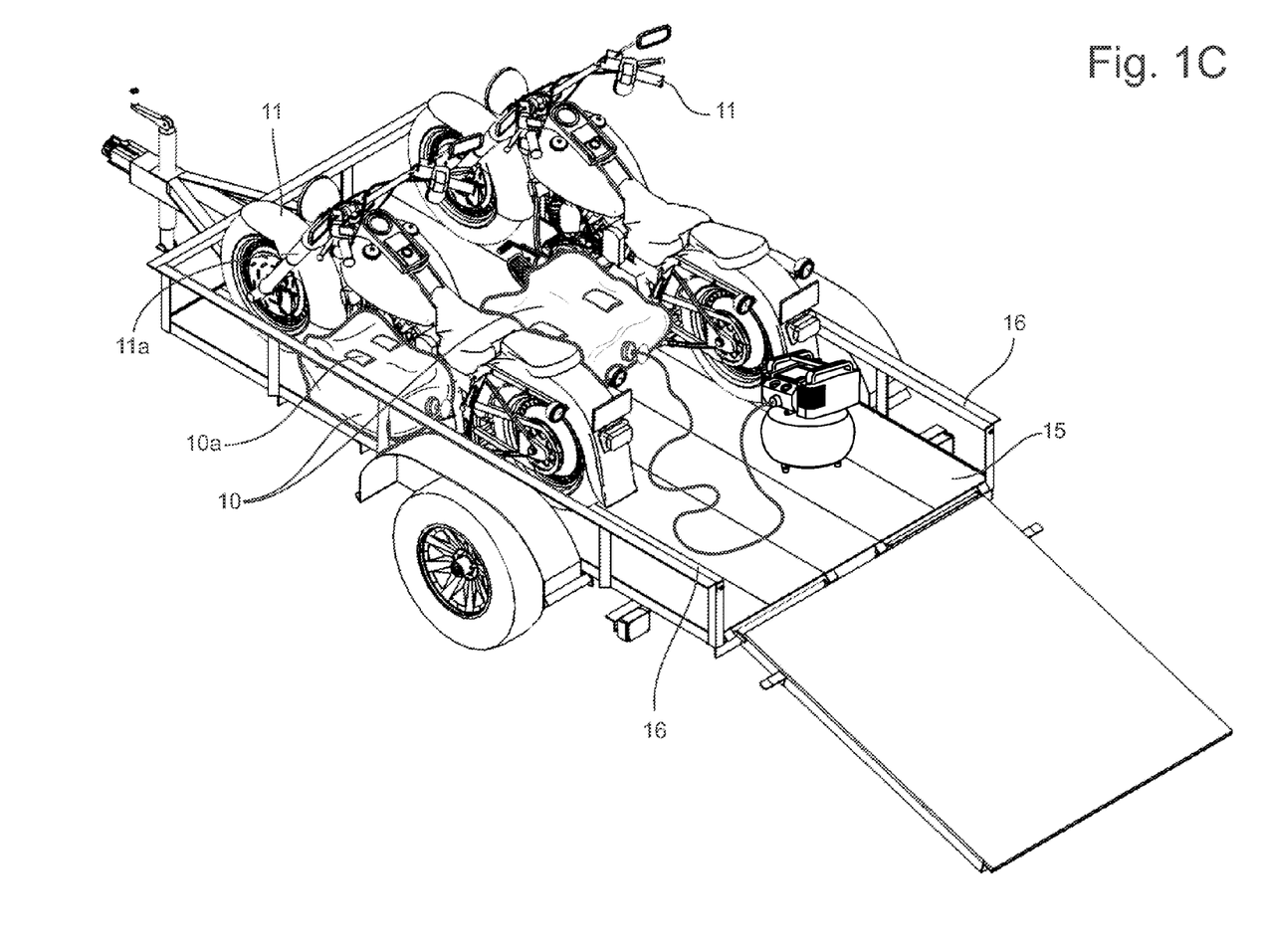
Figure 1D:
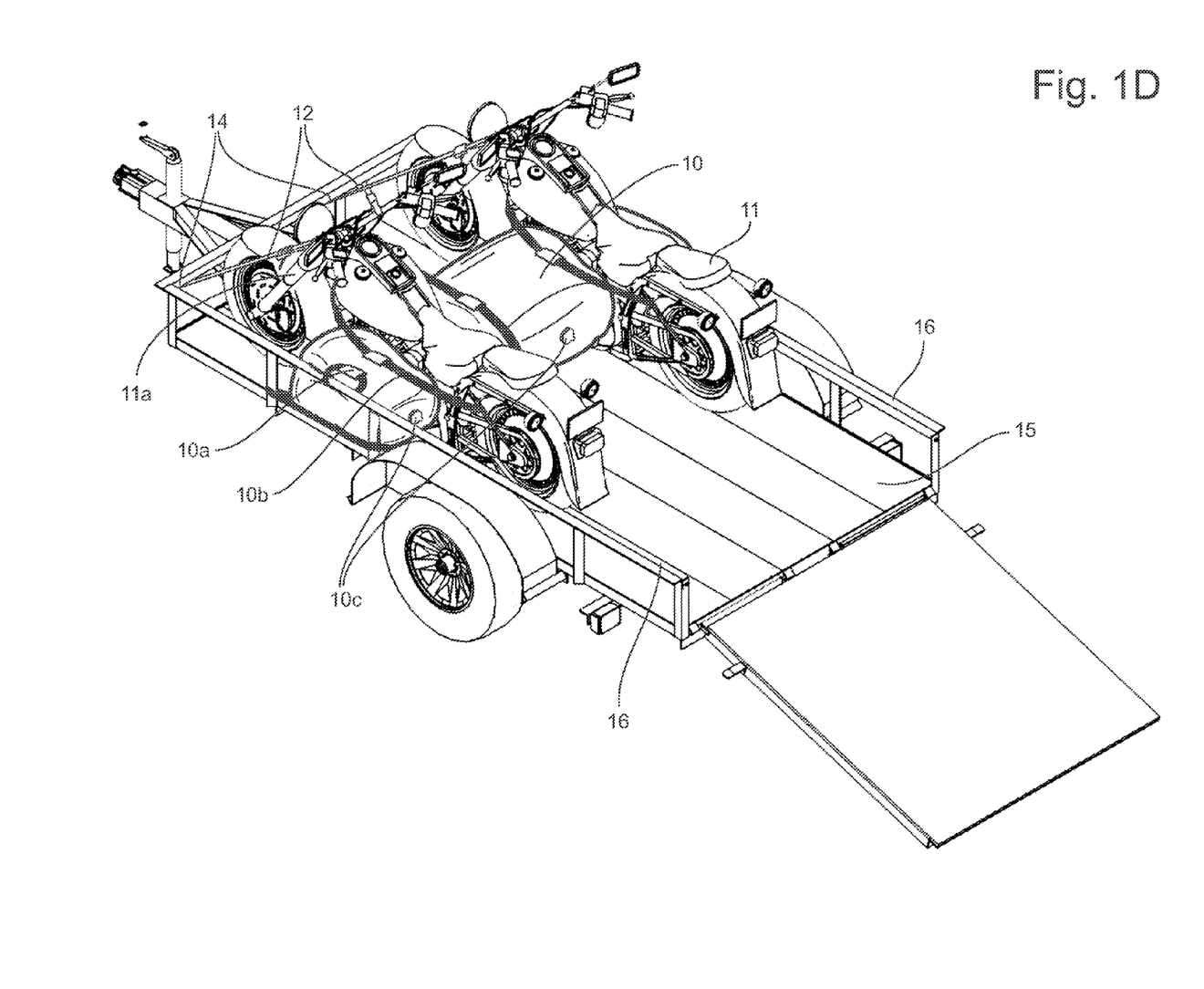
Figure 1E:
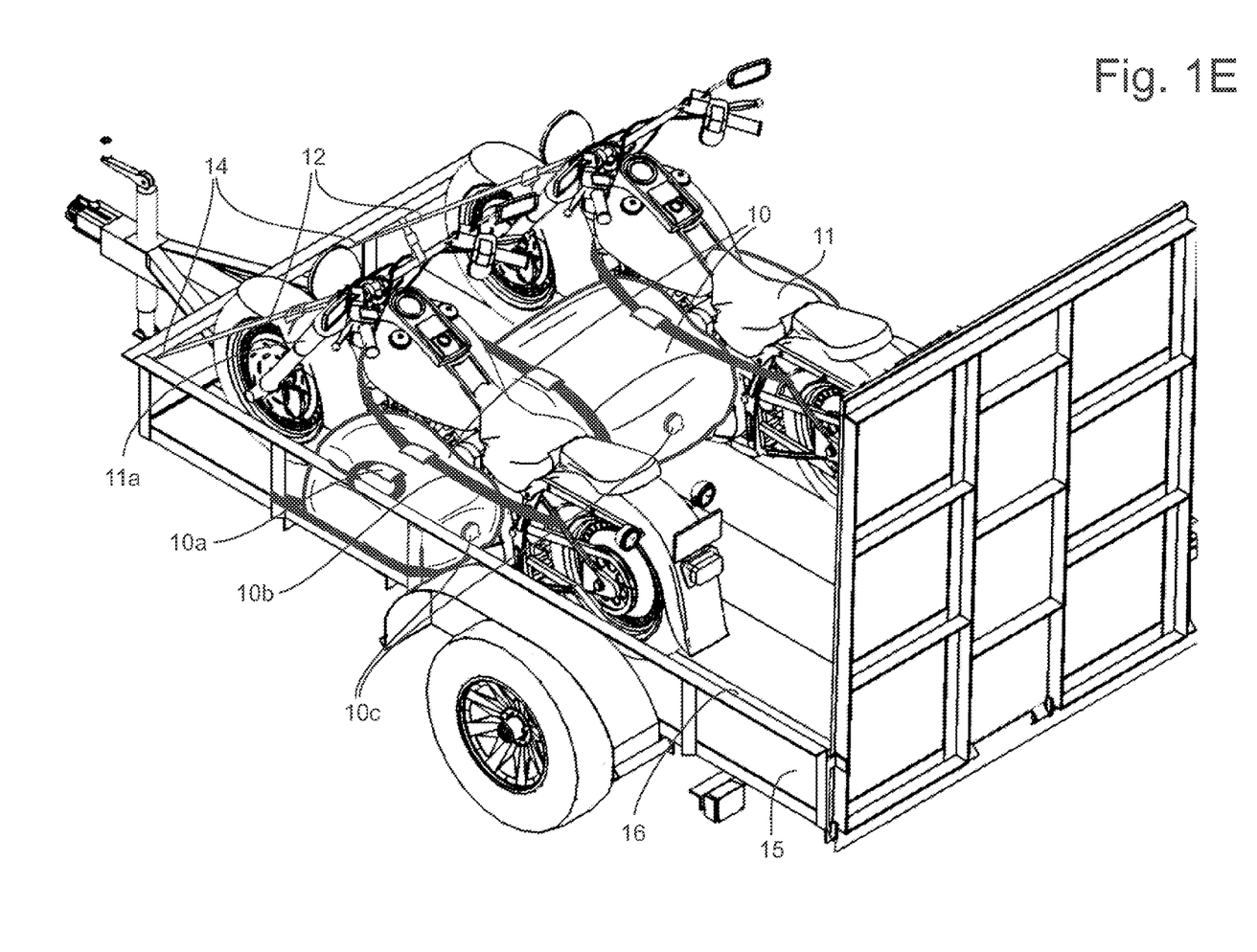
Figure 2:
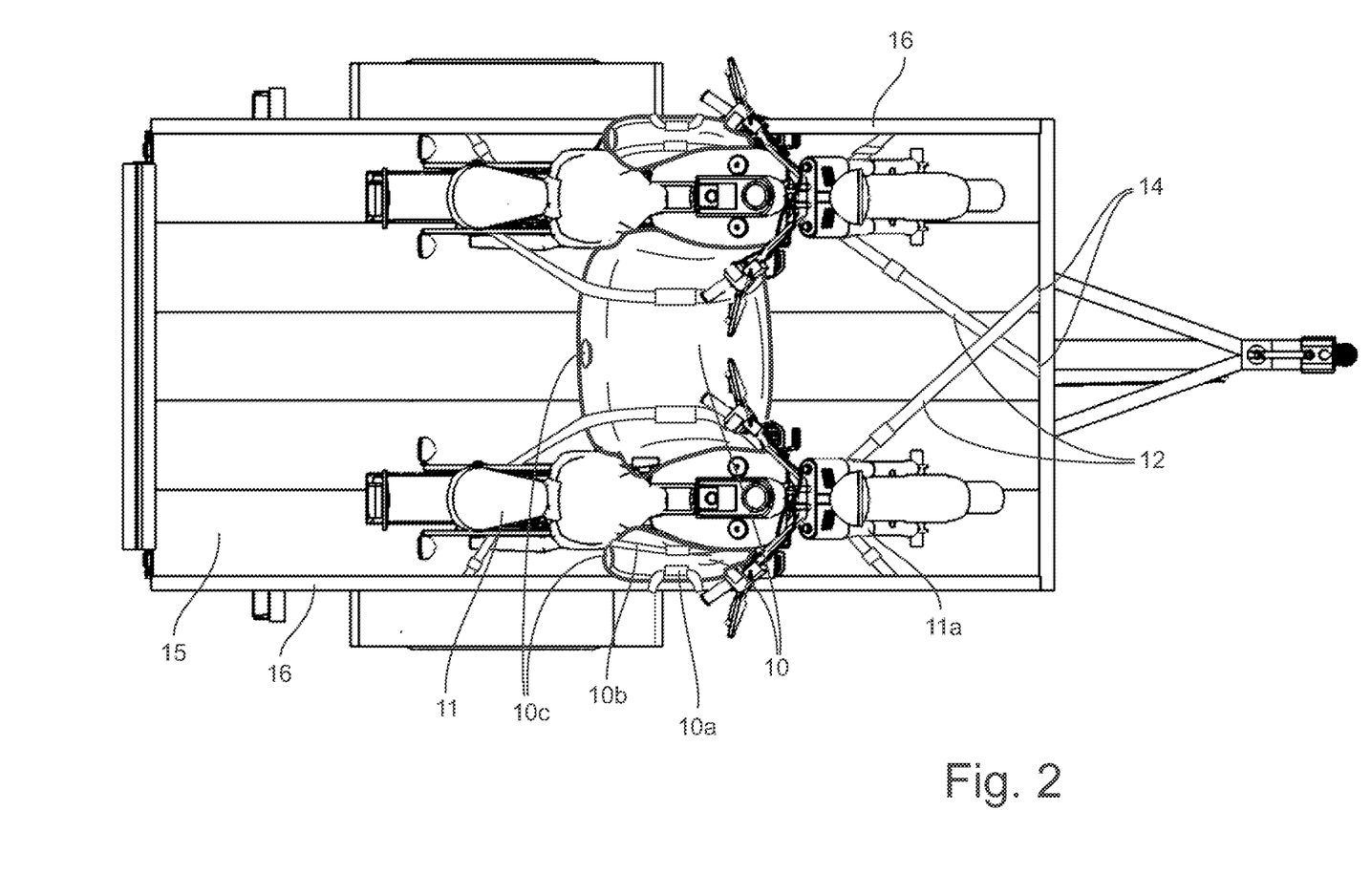
FIG. 2 is an overhead view of two motorcycles positioned, secured, and protected with inflatable bumpers in a trailer according to one possible embodiment of the invention.

In further detail, referring to FIG. 2, three inflated bumpers 10 apply force on either side and in between two motorcycles 11 and the opposing truck/trailer vertical walls 16 to stabilize the two motorcycles 11 in an upright position. The inflated bumpers 10 are nonabrasive and flexible to the contours of the motorcycles 11 and secured to the motorcycles by harness straps 10b and harness loops 10a. The typical manner known in the art in which motorcycles have been secured for transport prior to this invention is shown by the front strap 12 compressing the motorcycle front suspension 11a through tension to the anchor points 14.

Figure 3:
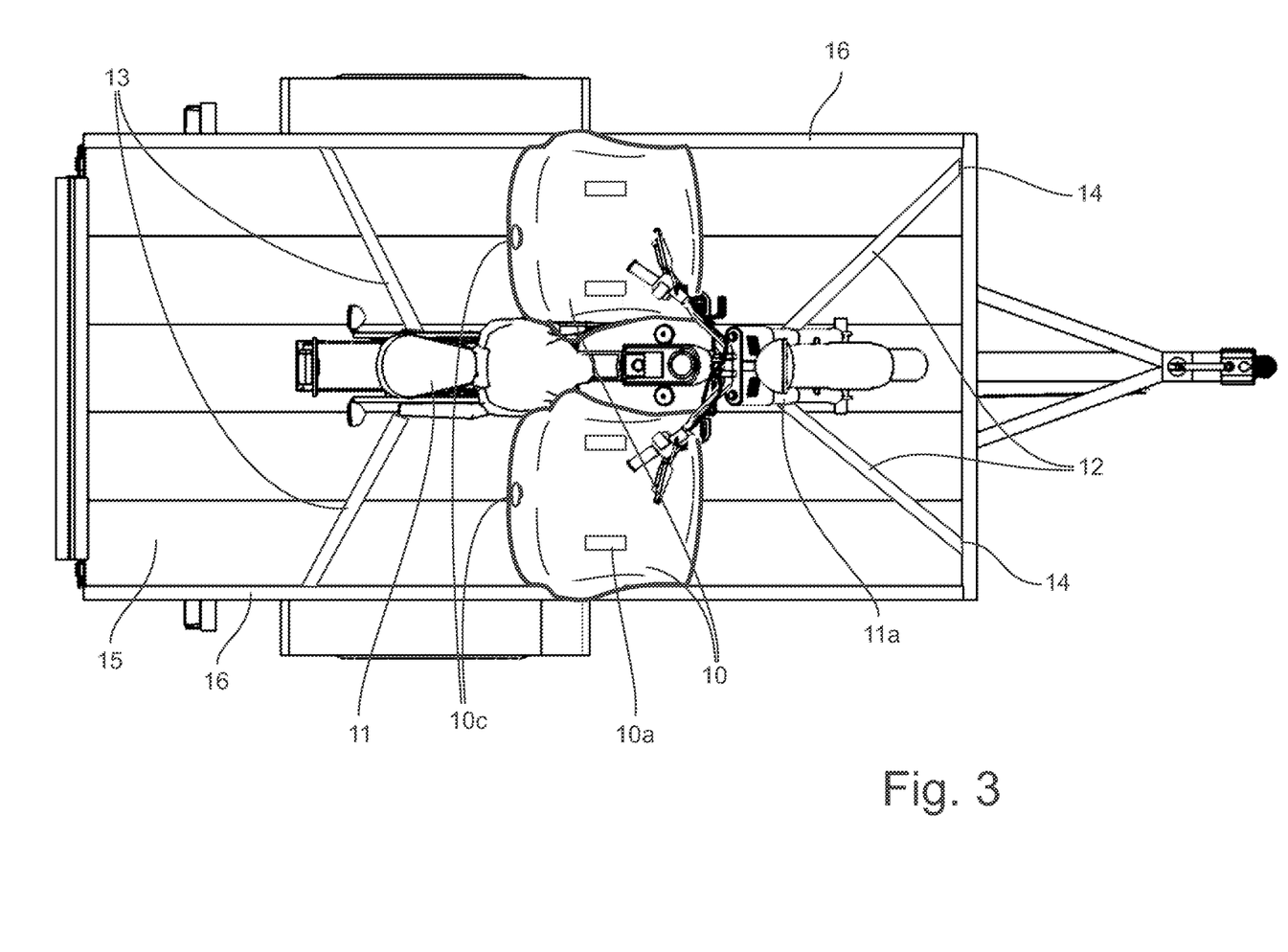
FIG. 3 is an overhead view of one motorcycle positioned, secured, and protected with inflatable bumpers in a trailer according to one possible embodiment of the invention.

In further detail, referring to FIG. 3, two inflated bumpers 10 inflated through air valves 10c apply air pressure force on either side of a motorcycle 11 and the opposing truck/trailer vertical walls 16 to stabilize the motorcycle 11 in an upright position. The inflated bumpers 10 are nonabrasive and flexible to the contours of the motorcycle 11 and are secured to the motorcycle by harness straps 10b and harness loops 10a. The typical manner known in the art in which motorcycles have been secured for transport prior to this invention is shown by the front strap 12 compressing the motorcycle front suspension 11a through tension to the anchor points 14, and the rear straps 13 holding the rear of the motorcycle 11 from lateral movement.

Figure 4:
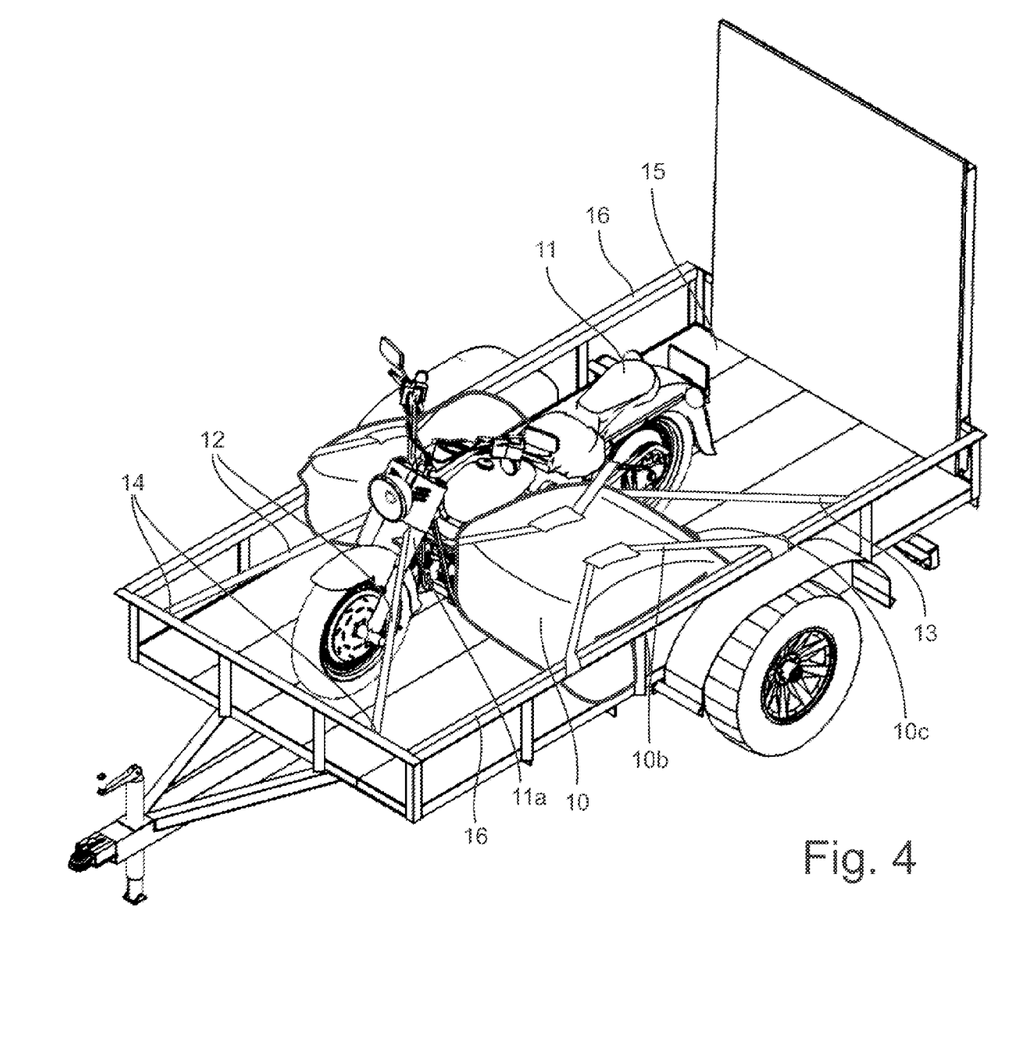
FIG. 4 is a perspective view of one motorcycle positioned, secured, and protected with inflatable bumpers in a trailer according to one possible embodiment of the invention.
Figure 5:
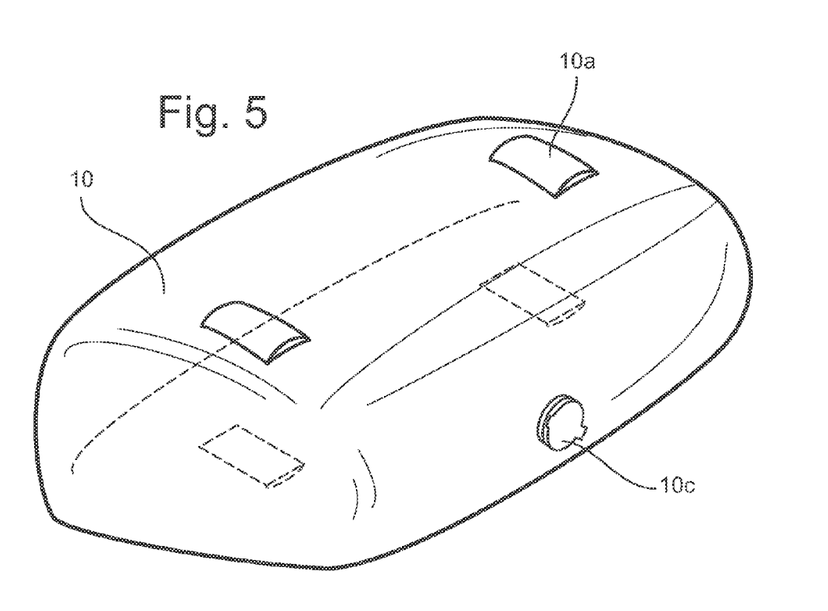
FIG. 5 is an enlarged perspective view of the inflated bumper of one possible embodiment of the invention.
Figures 6, 7:
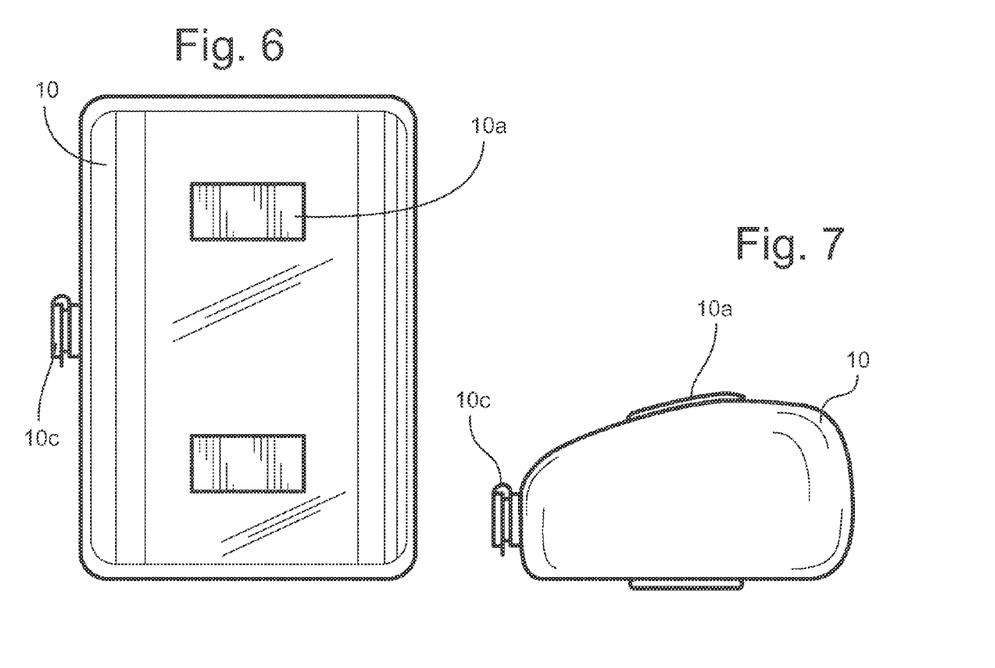
FIG. 6 is an enlarged overhead view of the inflated bumper of one possible embodiment of the invention.
FIG. 7 is an enlarged side view of the inflated bumper of one possible embodiment of the invention in a partially deflated state.
Figure 8:
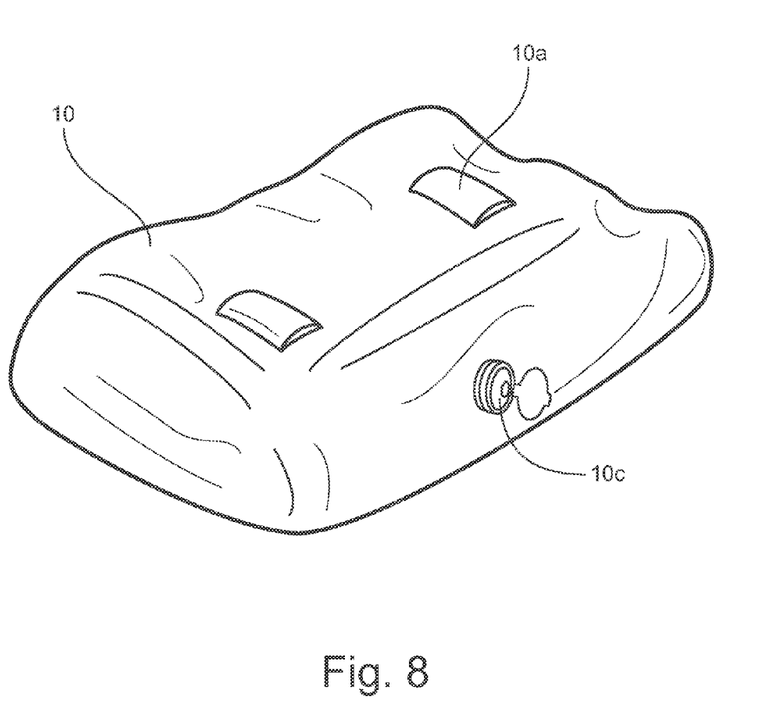
FIG. 8 is an enlarged perspective view of the deflated bumper of one possible embodiment of the invention.

In further detail, referring to FIG. 4, two inflated bumpers 10 inflated through air valves 10c apply air pressure force on either side of a motorcycle 11 and the opposing truck/trailer vertical walls 16 to stabilize the motorcycle 11 in an upright position. The inflated bumpers 10 are nonabrasive and flexible to the contours of the motorcycle 11 and are secured to the motorcycle by harness straps 10b and harness loops 10a. The typical manner known in the art in which motorcycles have been secured for transport prior to this invention is shown by the front strap 12 compressing the motorcycle front suspension 11a through tension to the anchor points 14, and the rear straps 13 holding the rear of the motorcycle 11 from lateral movement.

In further detail, referring to FIGS. 5, 6, 7, and 8, respectively, there is shown enlarged top, front, and side perspectives of the the inflated bumper 10, harness loop 10a, harness strap 10b, and air valve 10c.

In one embodiment of the invention, the inflatable bumper 10 is constructed of rubber.

In one embodiment of the invention, the inflatable bumper 10 is constructed of plastic.

In one embodiment of the invention, the inflatable bumper 10 is constructed of kevlar.

In one embodiment of the invention, the inflatable bumper 10 is constructed of a composite material.

In one embodiment of the invention, the inflatable bumper 10 has an outer surface layer that will not scratch the paint or chrome on the motorcycle 11.

In one embodiment of the invention, the inflatable bumper 10 has an outer surface layer of fabric.

In one embodiment of the invention, the inflatable bumper 10 is constructed of a material resistant to ultra-violet rays.

In one embodiment of the invention, the inflatable bumper 10 is constructed of a material resistant to chemical agents.

In one embodiment of the invention, the inflatable bumper 10 has seam welds of at least an inch overlap.

In one embodiment of the invention, the inflatable bumper 10 remains inflated with at least one ton of dead weight applied.

In one embodiment of the invention, the valve 10c is a presta valve.

In one embodiment of the invention, the valve 10c is a schrader valve.

In one embodiment of the invention, the valve 10c is a combination schrader and presta valve.

In one embodiment of the invention, the shape and dimensions of the fully inflated inflatable bumper 10 are calculated and custom fit to fill the void of space created by a given model of motorcycle when positioned in a given truck or trailer.

In one embodiment of the invention, the dimensions of the inflatable bumper 10 are approximately twenty inches long by ten inches high by twenty-four inches wide when fully inflated.

In one embodiment of the invention, a process and method for securing motorcycle(s) 11 is to place into position and inflate the inflatable bumper 10 after motorcycle(s) 11 are secured for transport in the typical manner by the front strap 12 compressing the motorcycle front suspension 11a through tension to the anchor points 14, and the rear straps 13 holding the rear of the motorcycle 11 from lateral movement.

In one embodiment of the invention, a process and method for releasing motorcycle(s) 11 is to first partially deflate the inflatable bumper 10 by opening the valve 10c and second release the harness strap(s) 10b and any other straps securing the motorcycle(s) 11.

In one embodiment of the invention, the inflatable bumper 10 may be deflated and compactly stored.

The advantages of the present invention include, without limitation, unprecedented protection of motorcycles from damage during transport, a method and process that is simple and requires only a few minutes, and convenience of deflating the inflatable bumper for easy storage.

While the foregoing written description of the invention enables one of ordinary skill to make and use what is considered presently to be the best mode thereof, those of ordinary skill will understand and appreciate the existence of variations, combinations, and equivalents of these specific embodiments. The invention should therefore not be limited by the above described embodiments, but shall include all embodiments within the scope and spirit of the invention.

The invention claimed is:

1. A motorcycle transport protection system comprising:
   a. a motorcycle positioned upright in a transport vehicle;
   b. a first inflatable bumper positioned between the left side of the motorcycle and the left side of the transport vehicle, said first inflatable bumper having a nonabrasive surface and a shape, a size, and a material strength and flexibility to create stabilizing pressure forces, when inflated, against the motorcycle during transport;
   c. a second inflatable bumper positioned between the right side of the motorcycle and the right side of the transport vehicle;
   d. means for harnessing the inflatable bumpers to the motorcycle and means for harnessing the inflatable bumpers to the transport vehicle;
   e. means for inflating the inflatable bumpers to create air pressure forces on the sides of the motorcycle, the purpose of which is to stabilize and protect the motorcycle during transport; and
   f. means for deflating the inflatable bumpers to release the air pressure forces on the sides of the motorcycle, the purpose of which is to enable the motorcycle to be loaded and unloaded from the transport vehicle.

2. The motorcycle transport system of claim 1 further comprising:
   a. at least one additional motorcycle positioned upright in the transport vehicle and aligned in parallel; and
   b. at least one additional inflatable bumper positioned between the motorcycles.

3. The motorcycle transport system of claim 1 wherein the inflatable bumpers have a shape with one or more sides that conform to the contours of the sides of the motorcycle.

4. The motorcycle transport system of claim 1 wherein the inflatable bumpers each have a shape and dimensions that fill a void of space between either side of the motorcycle and the either side of the transport vehicle.

5. The motorcycle transport system of claim 1 wherein the inflatable bumpers have a shape and dimensions that fill a void of space between the motorcycle and an additional motorcycle which are aligned in parallel.

6. The motorcycle transport system of claim 1 wherein the inflatable bumpers have the flexibility to conform to the contours of the sides of the motorcycle.

7. The motorcycle transport system of claim 1 wherein the inflatable bumpers have the strength to support at least one ton of dead weight when the inflatable bumpers are fully inflated.

8. The motorcycle transport system of claim 1 wherein the inflatable bumpers are approximately twenty inches long by ten inches high by twenty-four inches wide when fully inflated.

* * * * *